United States Patent Office 3,072,489
Patented Jan. 8, 1963

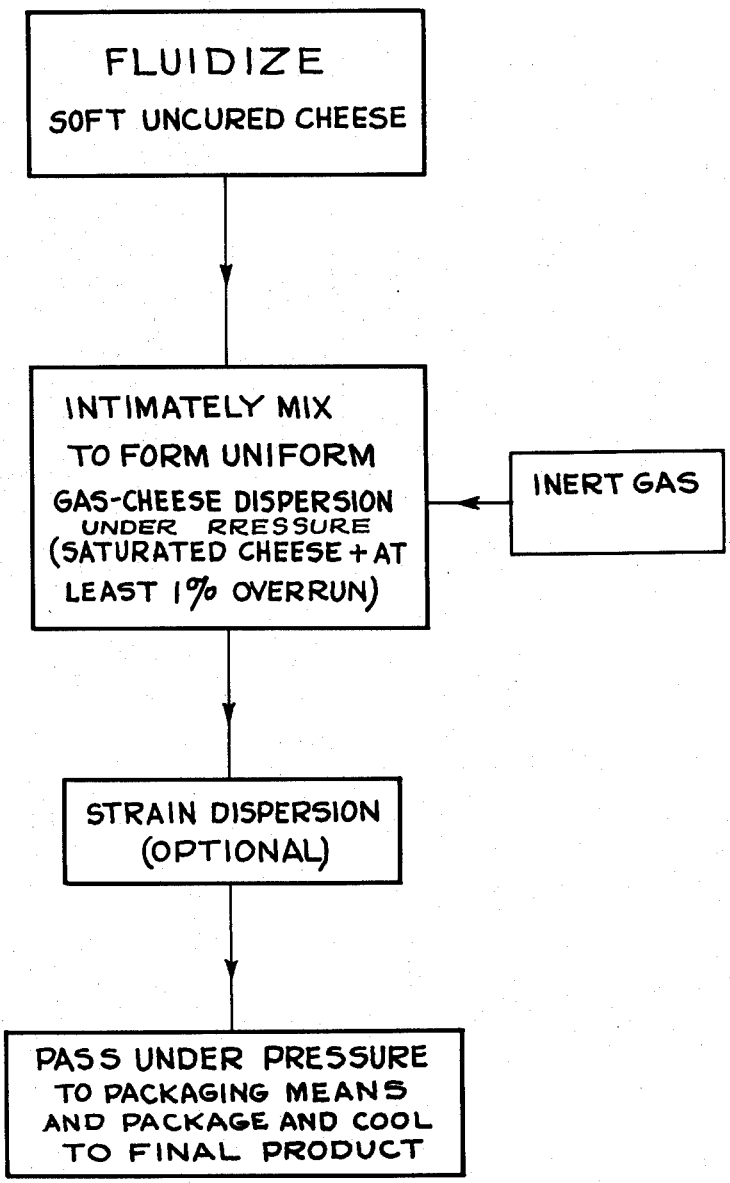

3,072,489
METHOD FOR TEXTURIZING CHEESE
John C. Hurlburt, Evanston, and George Howard Kraft, Wilmette, Ill., assignors to National Dairy Products Corporation, Chicago, Ill., a corporation of Delaware
Filed Feb. 27, 1961, Ser. No. 91,718
7 Claims. (Cl. 99—116)

The present invention generally relates to improvements in soft, uncured cheeses and more particularly relates to a method of texturizing soft, uncured cheeses, such as cream cheese and Neufchatel cheese, and the product thereof.

Soft, uncured cheeses, such as cream cheese and Neufchatel cheese are generally manufactured by two procedures. In both procedures, the cream or milk and cream mixture is first pasteurized. It may then be homogenized and is cooled to usually between about 62° F. and 80° F. and lactic acid culture, with or without rennet or other suitable culture which will develop the proper flavor and acidity in the finished cheese, is added to the cooled mix. The mix is held at the indicated temperature for from 8 to 18 hours, until proper acidity has developed and the whey begins to separate from the curd. The mix is then said to be properly ripened.

According to one procedure, the whey is then drained off from the ripened curd while the curd is held in filter bags or the like at a low temperature, slightly above freezing. The curd is then packaged in either of two ways: by cutting it into prints of a proper size and wrapping it (i.e., cold packing); or by heating the curd to between about 140° F. and 180° F., that is, until it is fluidized, and pouring it into boxes or other suitable packages (hot packing), wherein it is cooled to a solid mass.

The second procedure for manufacturing the cheese is that disclosed in U.S. Patent No. 2,387,276 to Link and includes heating the mix to between about 135° F. and 180° F. and centrifuging the mix to separate fluidized cheese from whey. The cheese flows from the centrifuge and may be formed and packaged immediately.

Both of the described procedures for packing cheese in the fluidized state provide cheese which is pasteurized and which has an extended shelf life. Cheese packaged by the cold packing procedure will usually maintain its flavor and freshness for only a shorter period of time. The hot packed cheese usualy has a close body and a tight texture, while the cold packed cheese has a more open body and texture, and tends to be more easily spreadable. In some cases, it is desirable to prepare soft, uncured cheese having the long shelf life of the hot packed cheeses, while also having the more open body and texture of cold packed cheeses.

There now has been discovered a method of texturizing soft, uncured cheese to provide the indicated desired characteristics in the finished cheese. In accordance with the present invention, soft, uncured cheese prepared by any suitable method, such as those described above, is subjected to a method of texturizing which imparts to the cheese a more open texture and body than otherwise would be obtained by the particular cheese make procedure employed.

Accordingly, it is a principal object of the present invention to provide a method of texturizing soft, uncured cheeses in a controlled manner to impart a more open texture and body to the cheese. It is also an object to provide a method of texturizing soft, uncured cheeses which are fluidized prior to packaging. It is a further object to provide a method of texturizing cream cheese and Neufchatel cheese. It is also an object to provide improved soft, uncured cheese, more particularly to provide pasteurized soft, uncured cheese with an open body and texture. Further objects and advantages of the present invention will be apparent from a study of the following detailed description and the accompanying drawing of which:

The single FIGURE is a flow diagram schematically illustrating steps in the method of the present invention for texturizing soft, uncured cheeses.

The present invention generally comprises a method of texturizing soft, uncured cheese, such as cream cheese and Neufchatel cheese, and an improved product. More particularly, the present invention relates to a method of texturizing which involves incorporating an inert gas into fluidized soft, uncured cheese and forming a uniform dispersion therewith, the concentration of gas being in excess of that required for saturation of the cheese and sufficient to provide a more open body and texture in the cheese. The dispersion is maintained while the cheese is packaged so that an improved product is obtained which not only has extended shelf life, but also has improved more open texture and body.

In accordance with the texturizing method of the present invention, steps may be carried out as depicted in the accompanying schematic flow diagram. Cream cheese, Neufchatel cheese or other soft, uncured cheese prepared by a conventional cheese make procedure, such as those previously described, is fluidized prior to final packaging. Fluidizing can be readily accomplished by heating the soft, uncured cheese to a fluidizing temperature, usually in the range of between about 135° F. and about 180° F. Alternatively, the soft, uncured cheese can be fluidized by other means, as by beating or whipping solid or plastic cheese until it is flowable, even though the temperature may be below the above-indicated temperature. Such beating or whipping can be carried out in any suitable equipment, for example, an Oakes beater or the like. In most cases, fluidizing is effected by heating the cheese to fluidizing temperature. The cheese, when fluidized, is in a condition for suitable mixing with inert gas in accordance with the method of the present invention. Moreover, the cheese, when fluidized, can be pumped and various ingredients can be added thereto, as desired while in the fluidized state.

The fluidized cheese may pass, as by a gear or lobe pump, etc. to suitable means for introduction of inert gas for the cheese under pressure into the cheese and intimate dispersing of the gas with the fluidized cheese in accordance with the method of the present invention. Such dispersing of the inert gas with the fluidized cheese is carried out so that the resulting dispersion is readily maintained up to and including final packaging.

Any suitable mixing equipment may be utilized for effecting such mixing and dispersing of the gas and fluidized cheese. For example, a pump which permits introduction of the inert gas with the cheese during pumping may be used. An apparatus such as the B unit or a Votator can also be utilized. Alternatively, a homogenizer, such as a Viscolyzer can be employed.

Any suitable gas may be utilized in this step of the method, providing the gas is inert to the fluidized cheese, i.e., does not physically or chemically react therewith and does not impart a flavor thereto, change the color thereof and otherwise deleteriously affect the cheese. In this regard, nitrogen has been found to be a preferred inert gas for the cheese. However, such inert gases as helium, argon, krypton, xenon and the like can be substituted for the nitrogen or mixed therewith, as desired, in providing the inert gas under pressure in the mixing apparatus.

The inert gas is dispersed in the fluidized cheese in the mixing apparatus at a controlled level and preferably under a pressure of about 50 p.s.i. or more. The pressure in the mixing apparatus assures formation of the dispersion, with the inert gas in sufficiently dispersed form therein to achieve desired texturizing without production of a cheese which has a crumbly texture. Thus, a sufficient concentration of the inert gas should be intimately dispersed with the cheese to open the texture of the cheese. It has been found that the concentration of inert gas necessary for such purposes is one which is sufficient to saturate the fluidized cheese and to provide at least a 1 percent, by volume of the cheese, overrun. That is, the total volume of the cheese after the inert gas introduction should be at least 1 percent greater than the total volume of the cheese before the inert gas introduction into the cheese. The relative volumes, however, are measured at atmospheric pressure. It has been found that the overrun should usually not be more than about 5 percent, by volume, of the cheese, inasmuch as larger overruns and consequent greater concentrations of inert gas in the cheese may result in finished cheese which has a crumbly, generally undesirable texture. It has been found that a 3 percent overrun usually provides the best results.

The substantial criticality of the level of inert gas in the cheese is a unique feature with soft, uncured, cheeses, and is a newly discovered phenomenon in respect to such cheeses. It is known to provide whipped butter, margarine and other fatty products containing very high gas levels, such as about 50 percent overruns. However, such high overruns are wholly unsatisfactory in the manufacture of soft, uncured cheeses, such as cream cheese and Neufchatel cheese. It is appreciated that certain types of cheeses have been packed in gaseous atmospheres, but such packaging does not result in texturizing of the cheese. Accordingly, it is unique to provide, in accordance with the present invention, a soft, uncured, pasteurized cheese product having an open body and texture and with extended shelf life.

Inert gas should be maintained in dispersion in the fluidized cheese up to and including setting of the cheese to a solid condition. However, in many instances, the dispersion during processing will undergo substantial working before setting of the cheese. As an example, movement of the dispersion to the filling and packaging equipment normally results in substantial working of the dispersion. So also does passage of the dispersion through a line strainer, as shown in FIGURE 1 (e.g. 30 mesh strainer). Such substantial working of the dispersion tends to promote loss of inert gas therefrom with consequent reduction of the percentage overrun and reduction in the texturizing of the cheese.

Accordingly, it is desirable and/or necessary to provide an increased pressure in the system containing the dispersion, at least from the point of formation of the gas-cheese dispersion to the point of passage of the fluidized cheese dispersion to filling equipment, i.e., in the portion of the system wherein the dispersion is substantially worked, in order to prevent undue loss of inert gas from the dispersion. The increased pressure aids in retaining the gas in finely dispersed form in the cheese. However, once the substantial working of the cheese has ended, the dispersion can be subjected to atmospheric pressure without serious loss of inert gas. Thus, for example, the cheese can be passed into a filling machine operating at atmospheric pressure so long as the filling machine does not substantially work the cheese.

The indicated increased pressure to which the dispersion is subjected during substantial working thereof will vary depending upon the type of cheese worked, temperature of the cheese, etc. However, in many instances, a pressure of about 50 p.s.i.g. or more is satisfactory. Usually, smaller pressures during substantial working of the dispersion tend to allow coalescing of gas bubbles in the dispersion with consequent production of cheese having a crumbly texture. The indicated increased pressure during substantial working of the dispersion can be effected in any suitable manner, for example, by providing a pressure valve in the equipment line to produce a back pressure in the system. The valve may be disposed upstream from the filling equipment and downstream from the previously described mixing apparatus. The best results, with respect to reduction of inert gas in the dispersion in desired form, can usually be obtained by imposing a pressure of about 70 p.s.i.g. during working of the dispersion. However, the texturizing method of the present invention has been successfully carried out utilizing pressures of up to 1000 p.s.i.g. and above.

It will be understood that in the event that the gas is so intimately dispersed in the cheese that it is present in fine bubble form due to greatly increased mixing, as by high speed homogenizing or the like, it may not be necessary in a given instance to employ the indicated pressure of about 50 p.s.i.g. or more to the dispersion in order to maintain the inert gas in the dispersion in desired form.

In accordance with the present invention, the fluidized cheese in dispersion with the inert gas is packaged. This step can be carried out utilizing any suitable equipment, which as indicated previously, does not substantially effect working of the product if atmospheric conditions are to be used. The equipment, of course, should not otherwise work out the dispersed gas from the cheese. The dispersion may first be passed to a conventional filling machine for cream cheese or the like, which machine operates at atmospheric pressures without substantially working the cheese. It will be understood that it is also possible to utilize a filling machine which operates at an increased pressure if such machine substantially works the dispersion. The fluidized cheese can be dispensed from a filling machine in controlled quantities directly into suitable containers, such as jars, metal foil, etc. passing in close proximity to the filling machine outlet. The filled containers can then be sealed by suitable conventional equipment, the cheese solidifying after packaging to provide the finished improved product. Such product has been pasteurized to give extended shelf life yet has a more open texture and body due to the method of the present invention. Accordingly, the combined features of conventional soft, uncured cheeses packaged by hot pack packing methods with features of soft, uncured cheeses packaged by cold packing methods are embodied in the improved product of the present invention.

The following examples further illustrate certain features of the present invention:

EXAMPLE I

Cream cheese prepared in accordance with a conventional cream cheese procedure which included pasteurization of the cheese was fluidized by heating to a temperature of about 160–165° F. and the fluidized cream cheese was passed by a screw conveyor to a blending apparatus. Locust bean gum and salt were added to the cheese during passage through the conveyor. The cheese was held in the blending apparatus for a short time at about 160–165° F. and was then passed by a gear pump (Waukesha pump) to a two-stage "mix-air" pump, the second stage thereof having 3 times the capacity of the first stage. In the "mix-air" pump, nitrogen gas was introduced in a metered amount to the hot cheese (still about 160° F.) to provide an overrun volume of 3 percent of the volume of the cheese. The hot cheese and nitrogen were intimately mixed under pressure in the "mix-air" pump to provide a stable uniform dispersion of the gas with the cheese, which exited the pump at about 95 p.s.i.g. and was then passed while still fluid to a 30 mesh line strainer to keep the gas uniformly distributed in the cheese and remove any lumps from the cheese. A back pressure valve was provided in the line downstream from the line strainer to maintain the fluid gas-cheese dispersion under a pressure of about 70 p.s.i.g. until the dispersion was ready to be packaged. The fluid gas-cheese dispersion was passed downstream of the back pressure valve and into the open hopper of a cheese filling machine, which machine controlled the flow of the cheese into one-half pound packages. The machine operated at atmospheric pressure without substantial working of the cheese. The cream cheese in the filled packages was wrapped, allowed to cool to a fully set, solid condition and thereupon several such one-half pound packages were opened and the solidified cheese samples therein were removed, broken open and evaluated visually and in the mouth for texture. Each of the samples exhibited a more open texture and desirable body, than control samples subjected to the identical procedure, except that no gas was introduced into the control samples. Moreover, all samples had an extended shelf life (about 4 weeks).

EXAMPLE II

A number of one-half pound cream cheese samples prepared in accordance with a conventional cheese make procedure in production apparatus were treated in accordance with the texturizing method set forth in Example I, except as otherwise specified in the table below. The finished samples were evaluated visually and in the mouth for texture, the results being set forth in the following table.

Table

| Cream Cheese Sample | Back Pressure On Cheese- Gas Dispersion From Formation to Filling | Overrun (percent by vol. of cheese) | Texture Evaluation |
|---|---|---|---|
| A | 70 | 3 | open. |
| B | 55 | 3 | open. |
| C | 1 400 | 5 | open. |

1 Homogenizer (Viscolyzer) substituted for "mix-air" pump.

The results set forth in the table of Example II, as well as the results specified in Example I, clearly show that open textured soft, uncured cheese, such as cream cheese, can be obtained utilizing the texturizing method of the present invention. In addition, the cheese samples obtained as shown in the table of Example II had, as did the samples prepared in accordance with Example I, extended shelf life.

Accordingly, an improved pasteurized soft, uncured cheese product can be provided in accordance with the present invention, which product not only has extended shelf life (up to 4 weeks or more), but also an improved open texture. The method of the present invention provides a simple, effective way of texturizing soft, uncured cheeses to provide the desired results. Although the method of the present invention has particular application in the texturizing of soft, uncured cheeses which are hot packed, it will be understood that the method is also suitable in the texturizing of soft, uncured cheeses packed by other packaging procedures.

Various of the features of the present invention are set forth in the appended claims.

What is claimed is:

1. A method of texturizing soft uncured cheese, which method comprises the steps of uniformly dispersing in fluidized cheese a concentration of inert gas for said cheese in excess of that required to saturate said cheese so as to open the texture of said cheese, and thereafter packaging said cheese.

2. A method of texturizing soft uncured cheese, which method comprises the steps of uniformly dispersing under pressure in fluidized cheese a concentration of inert gas for said cheese in excess of that required to saturate said cheese so as to open the texture of said cheese, and thereafter packaging said cheese while substantially maintaining said gas in dispersion with said cheese, whereby said cheese is provided with an open texture.

3. A method of texturizing soft uncured cheese, which method comprises the steps of fluidizing soft uncured cheese, uniformly dispersing under pressure in said fluidized cheese a sufficient concentration of inert gas for said cheese to provide at least one percent, by volume, overrun in said fluidized cheese, and thereafter packaging said cheese while substantially maintaining said gas in dispersion with said cheese, whereby said cheese is provided with an open texture.

4. A method of texturizing soft uncured cheese, which method comprises the steps of fluidizing soft uncured cheese, uniformly dispersing under pressure in said fluidized cheese a sufficient concentration of inert gas for said cheese to provide at least one percent, and not more than about five percent, by volume, overrun in said cheese, and thereafter packaging said cheese while substantially maintaining said gas in dispersion with said cheese, whereby said cheese is provided with an open texture.

5. A method of texturizing soft uncured cheese, which method comprises the steps of fluidizing soft uncured cheese, uniformly dispersing under pressure of at least about 50 p.s.i. in said fluidized cheese a sufficient concentration of inert gas for said cheese to provide at least one percent, and not more than about five percent, by volume, overrun in said fluidized cheese, and thereafter packaging said cheese while substantially maintaining said gas in dispersion with said cheese, whereby sad cheese is provided with an open texture.

6. A method of texturizing soft uncured cheese, which method comprises the steps of fluidizing soft uncured cheese, uniformly dispersing under pressure of at least about 50 p.s.i. in said fluidized cheese a sufficient concentration of inert gas for said cheese to provide at least one percent, and not more than about five percent, by volume, overrun in said fluidized cheese, maintaining at least said pressure on said fluidized cheese until said cheese is ready for packaging, and thereafter packaging said cheese, whereby said cheese is provided with an open texture.

7. A method of texturizing cream cheese, which method comprises the steps of heating cream cheese and fluidizing said cheese, uniformly dispersing under pressure of at least about 50 p.s.i. in said fluidized cheese a sufficient concentration of nitrogen gas for said cheese to provide at least one percent, and not more than about five percent, by volume, overrun in said fluidized cheese, maintaining said pressure on said fluidized cheese until said fluidized cheese is ready for packaging and hot packing said cheese while substantially maintaining said gas in dispersion with said cheese.

References Cited in the file of this patent

UNITED STATES PATENTS

| 1,868,547 | Stevenson | July 26, 1932 |
| 2,120,297 | Reinecke | June 14, 1938 |
| 2,714,069 | Stuart et al. | July 26, 1955 |